US005755430A

United States Patent [19]

Couch

[11] Patent Number: 5,755,430
[45] Date of Patent: May 26, 1998

[54] TRAILER JACK LEVELING ADAPTER

[76] Inventor: Ernest C. Couch, 14 Park Terrace Dr., Hannibal, Mo. 63401

[21] Appl. No.: 812,023

[22] Filed: Mar. 6, 1997

[51] Int. Cl.$^6$ ........................................... B66F 9/04
[52] U.S. Cl. ........................................... 254/420; 254/424
[58] Field of Search ........................... 248/188.4, 352;
    280/475, 763.1; 254/424, 418, 420, 423,
    DIG. 1, DIG. 4, 100

[56] References Cited

U.S. PATENT DOCUMENTS

| | | | |
|---|---|---|---|
| 2,771,787 | 11/1956 | Dixon | 254/424 |
| 3,433,457 | 3/1969 | Van Der Ende | 254/423 |
| 4,266,809 | 5/1981 | Wuerflein | 254/DIG. 1 |
| 4,556,200 | 12/1985 | Shoemaker | 254/424 |
| 4,921,269 | 5/1990 | Scully | 254/424 |
| 5,203,039 | 4/1993 | Fredman | 248/188.4 |
| 5,219,429 | 6/1993 | Shelton | 254/423 |
| 5,527,054 | 6/1996 | Williams | 254/424 |

*Primary Examiner*—Robert C. Watson

[57] ABSTRACT

Disclosed is a trailer jack leveling adapter for improving a fifth wheel trailer jack stand having a pair of downwardly telescoping leg assemblies whereby one of the leg assemblies may be adjusted to compensate for an uneven supporting surface for leveling the trailer. The trailer jack leveling adapter comprises a connector fixedly attached to a lower end of a leg assembly. An elongated leg extension is longitudinally adjustably engaged with the connector. The leg extension is also pivotally connected at a lower end thereof to a leg assembly foot pad such that the leg extension and foot pad may be moved relative the leg assembly for leveling the trailer.

9 Claims, 4 Drawing Sheets

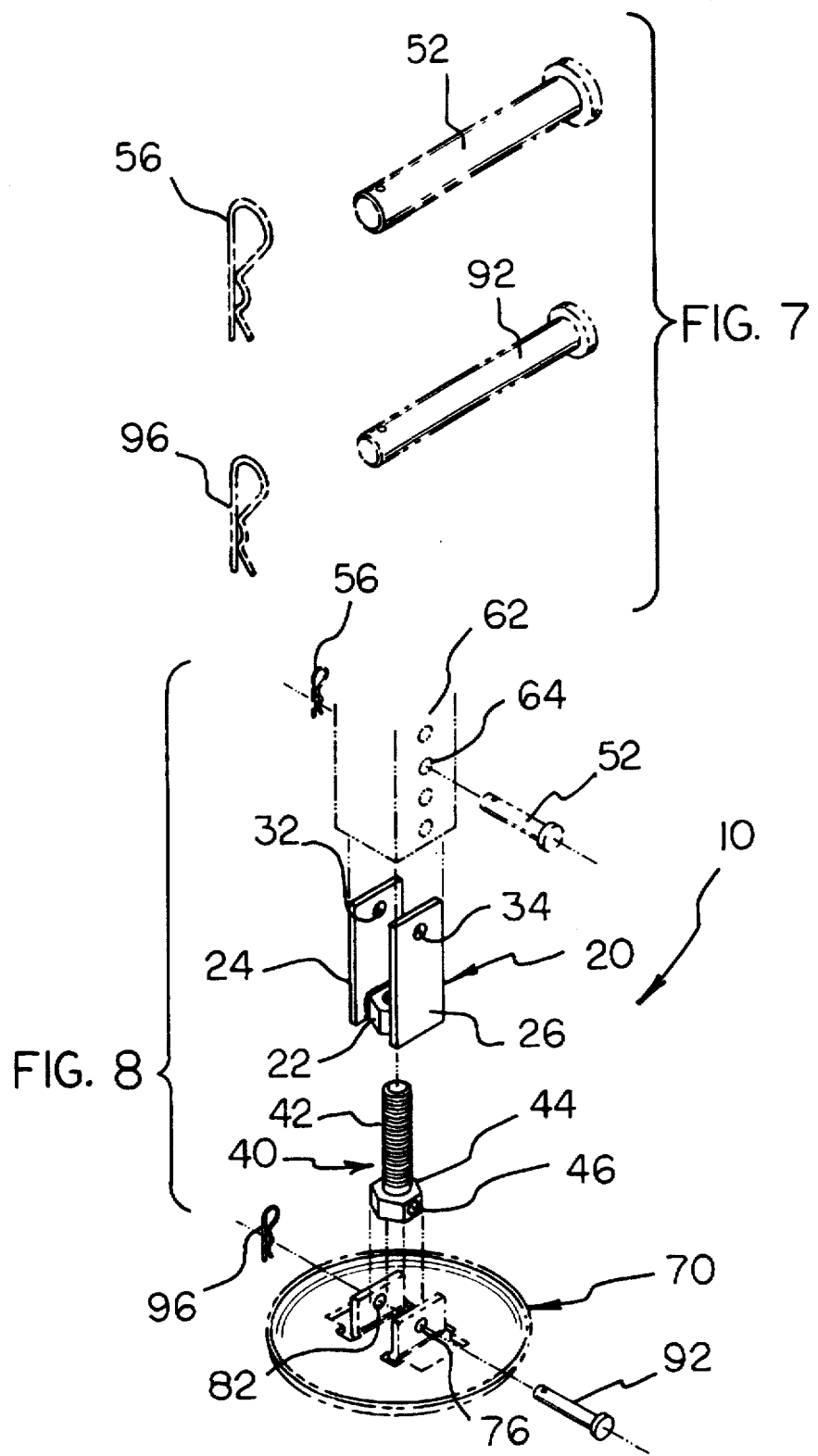

TRAILER JACK LEVELING ADAPTER

BACKGROUND OF THE INVENTION

1. Field of the Invention

The present invention relates to trailer jack stands and more particularly pertains to a trailer jack leveling adapter which may be adapted for improving a fifth wheel trailer jack stand whereby one of the jack stand legs may be adjusted to compensate for an uneven supporting surface and inclines.

2. Description of the Prior Art

The use of trailer jack stands is known in the prior art. More specifically, trailer jack stands heretofore devised and utilized for the purpose of supporting trailers when not connected to a towing vehicle are known to consist basically of familiar, expected and obvious structural configurations, notwithstanding the myriad of designs encompassed by the crowded prior art which have been developed for the fulfillment of countless objectives and requirements.

The present invention is directed to improving devices for supporting trailers when not connected to a towing vehicle in a manner which is safe, secure, economical and aesthetically pleasing.

Relevant prior art patents include U.S. Pat. No. 5,197,311 to Clark which describes a fifth wheel jack stand lock and U.S. Pat. No. 5,141,197 to Mackaay which discloses a camper bracer support.

The prior art also discloses a fifth wheel stabilizer as shown in U.S. Pat. No. 4,896,745 to Warnelov, U.S. Pat. No. 2,295,911 to Page, and U.S. Pat. No. 5,361,868 to Bartos.

While these devices fulfill their respective, particular objectives and requirements, the aforementioned patents do not disclose a fifth wheel trailer jack leveling adapter whereby one of the jack stand legs may be adjusted to compensate for an uneven supporting surface or incline for leveling the trailer when not attached to the towing vehicle.

In this respect, the trailer jack leveling adapter according to the present invention substantially departs from the conventional concepts and designs of the prior art, and in so doing provides an apparatus primarily developed for the purpose of improving a fifth wheel trailer jack stand whereby one of the jack stand legs may be adjusted to compensate for an uneven supporting surface for leveling the trailer, wherein such adjustment may be incremental or continuous.

Therefore, it can be appreciated that there exists a continuing need for a trailer jack leveling adapter which can be used for improving a fifth wheel trailer jack stand having a pair of linked downwardly telescoping leg assemblies, each leg assembly having an incrementally extensible tubular lower portion terminating in a foot pad attached with a clevis pin and retaining clip, by providing an independently continuously extensible coupling intermediate one of the leg assembly lower portions and it's foot pad whereby the leg may be adjusted to compensate for an uneven supporting surface or an incline by means of either incrementally or continuous adjustment for leveling the trailer. In this regard, the present invention substantially fulfills this need.

As illustrated by the background art, efforts are continuously being made in an attempt to develop devices for supporting trailers when not connected to a towing vehicle. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of trailer jack stands now present in the prior art, the present invention provides a trailer jack stand construction wherein the same can be utilized for improving a fifth wheel trailer jack stand whereby one of the jack stand legs may be adjusted to compensate for an uneven supporting surface for leveling the trailer. As such, the general purpose of the present invention, which will be described subsequently in greater detail, is to provide a trailer jack leveling adapter apparatus and method which has all the advantages of the prior art trailer jack stands and none of the disadvantages.

The invention is defined by the appended claims with the specific embodiment shown in the attached drawings. For the purpose of summarizing the invention, the invention may be incorporated into a trailer jack leveling adapter for improving a fifth wheel trailer jack stand having a pair of linked downwardly telescoping leg assemblies, each leg assembly having an incrementally extensible square tubular lower portion terminating in a foot pad attachable with a clevis pin and retaining clip. An independently continuously extensible coupling is provided intermediate one of the leg assembly lower portions and it's foot pad whereby the length of the leg may be adjusted to compensate for an uneven supporting surface to level the trailer.

The trailer jack leveling adapter comprises a threaded insert attached within a hollow lower end of the leg assembly lower portion with the existing clevis pin. The insert comprises a steel block having opposing square edges and an axial vertical threaded bore. The block also has an elongated steel tab projecting upwardly from each of the opposing edges thereof, the tabs being parallel the threaded bore. Each tab has a clevis pin receiving hole proximal an upper end thereof. The holes are aligned with each other and with a pair of clevis pin receiving holes through the leg assembly lower portion.

The existing clevis pin extends through the leg assembly holes and also extends through the holes of the tabs whereby securing the insert to the lower end of the leg assembly lower portion. The existing retaining clip is secured to the existing clevis pin whereby securing the pin to the leg assembly lower portion and the insert.

A generally vertical round steel post has a plurality of external threads formed thereon. The post also has a trailer leg assembly foot pad engagable enlarged head portion integrally formed on a lower end thereof. The enlarged head has a lateral bore therethrough alignable with a pair of opposed clevis pin receiving holes of the foot pad. A clevis pin extends through the receiving holes of the foot pad and also extends through the lateral bore of the enlarged head whereby pivotally securing the foot pad to the post. The clevis pin is secured to the foot pad and post with a retaining clip.

The post is threadedly engaged with the threaded bore of the insert such that rotating the post in one direction moves the foot pad upwardly toward the insert. Rotating the post in the other direction moves the foot pad downwardly away from the insert.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer jack leveling adapter which has all the advantages of the prior art leveling devices and none of the disadvantages.

It is another object of the present invention to provide a new and improved trailer jack leveling adapter which may be easily and efficiently manufactured and marketed.

It is a further object of the present invention to provide a new and improved trailer jack leveling adapter which is of a durable and reliable construction.

An even further object of the present invention is to provide a new and improved trailer jack leveling adapter which is susceptible of a low cost of manufacture with regard to both materials and labor, and which accordingly is then susceptible of low prices of sale to the consuming public, thereby making such trailer jack leveling adapter economically available to the buying public.

Still yet another object of the present invention is to provide a new and improved trailer jack leveling adapter which provides in the apparatuses and methods of the prior art some of the advantages thereof, while simultaneously overcoming some of the disadvantages normally associated therewith.

Still another object of the present invention is to provide an independently extensible coupling intermediate one of four leg assembly lower portions and it's foot pad whereby the coupling may be adjusted to compensate for an uneven supporting surface or an incline by means of either incrementally or continuous adjustment for leveling the trailer.

Another object of the present invention is to provide an independently extensible coupling intermediate one of four leg assembly lower portions and it's foot pad, whereby the foot pad is pivotally coupled to the extensible coupling for conforming to inclines or the like.

Lastly, it is an object of the present invention to provide a new and improved a trailer jack leveling adapter for improving a fifth wheel trailer jack stand having a pair of downwardly telescoping leg assemblies whereby one of the leg assemblies may be adjusted to compensate for an uneven supporting surface for leveling the trailer. The trailer jack leveling adapter comprises a connector fixedly attached to a lower end of a leg assembly. An elongated leg extension is longitudinally adjustably engaged with the connector. The leg extension is also pivotally connected at a lower end thereof to a leg assembly foot pad such that the leg extension and foot pad may be moved relative the leg assembly for leveling the trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a perspective view of the existing and added clevis pins and retaining clips of the invention of FIG. 1.

FIG. 8 is an exploded view of the invention of FIG. 1 showing its manner of construction.

Similar reference characters refer to similar parts throughout the several views of the drawings.

DESCRIPTION OF THE PREFERRED EMBODIMENT

Figure 1:
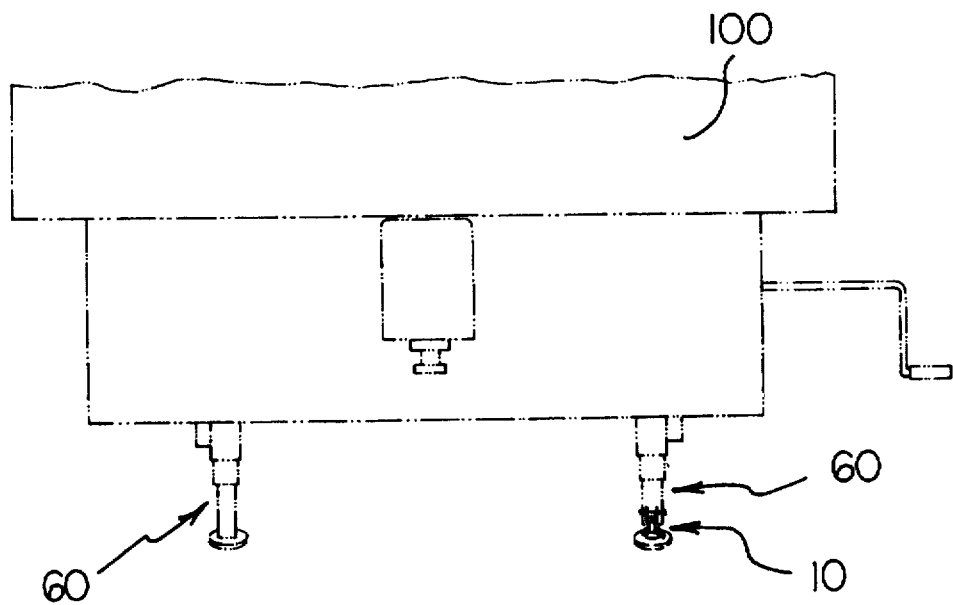
FIG. 1 is a top front perspective view of the preferred embodiment of the present invention showing its manner of use on a fifth wheel trailer.

With reference now to the drawings, and in particular to FIG. 1 thereof, a trailer jack leveling adapter embodying the principles and concepts of the present invention and generally designated by the reference numeral 10 will be described.

Figure 2:
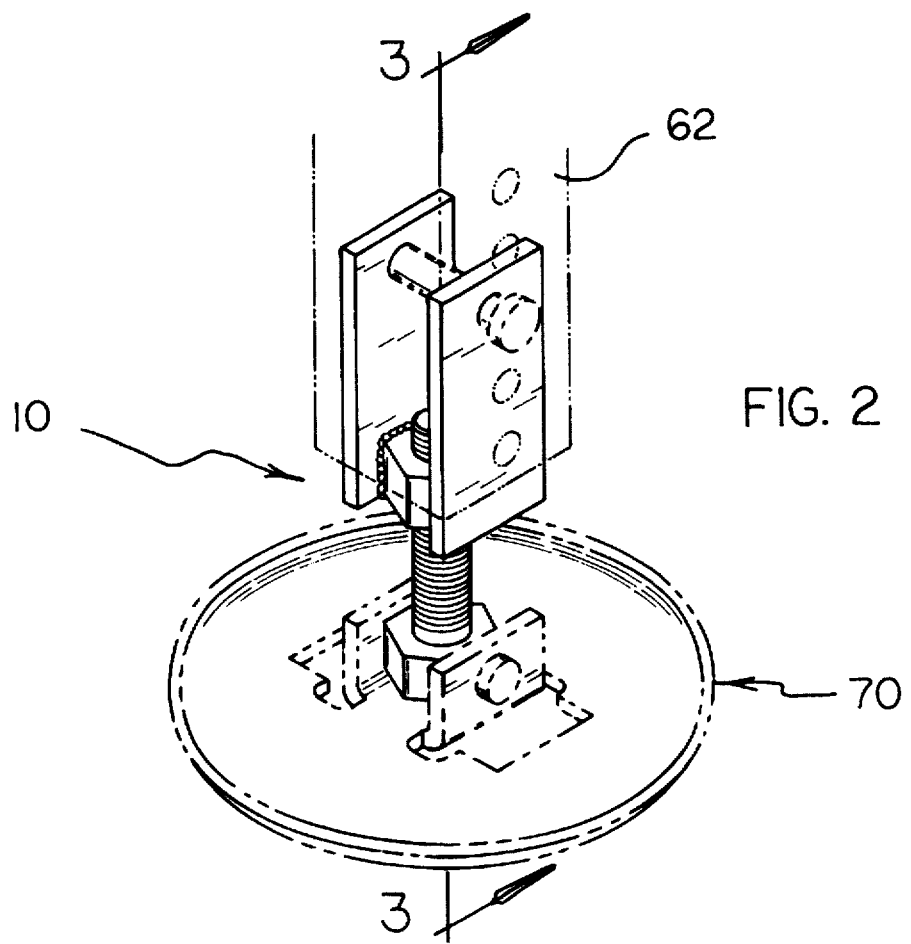
FIG. 2 is a top perspective view of the invention of FIG. 1 showing its manner of construction, the existing trailer jack leg being drawn in phantom lines.
Figure 3:
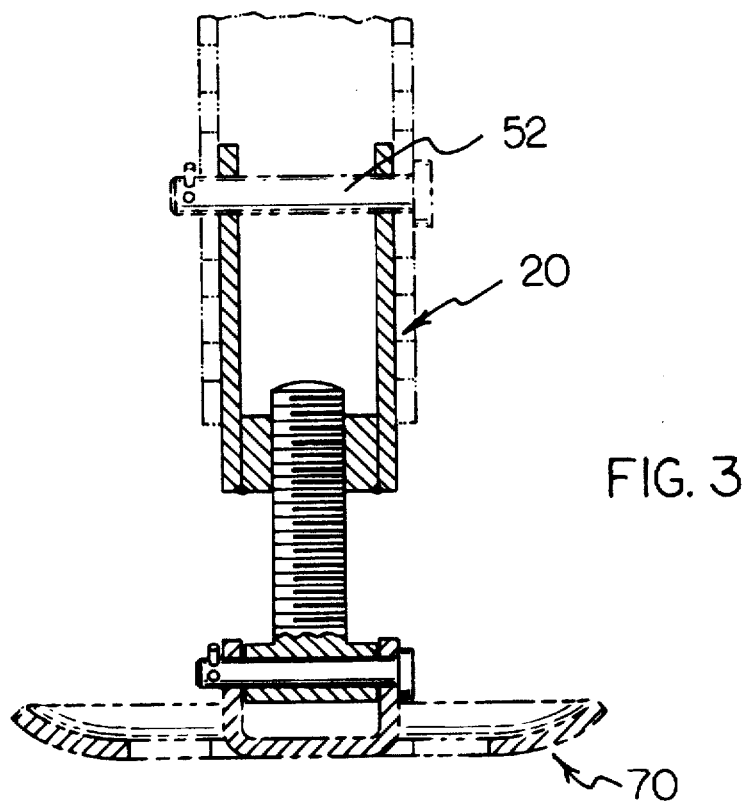
FIG. 3 is a sectional view of the invention of FIG. 2 taken along the line 3.
Figure 4:
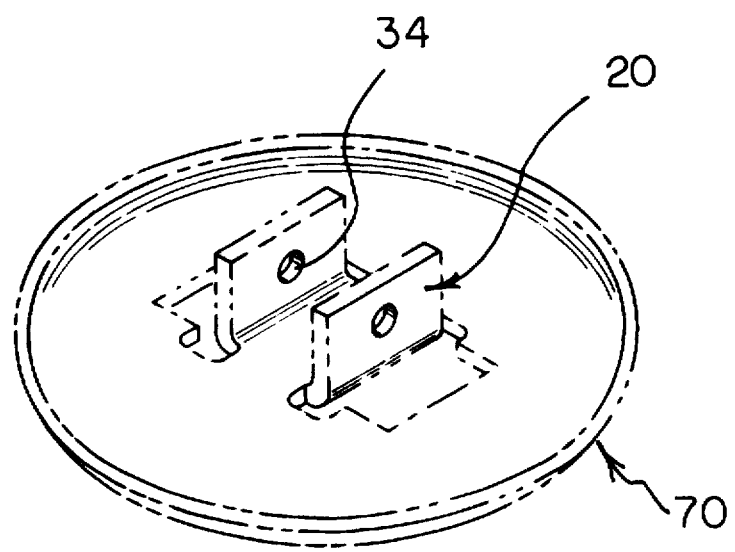
FIG. 4 is a top perspective view of the existing trailer jack leg foot pad.
Figure 5:
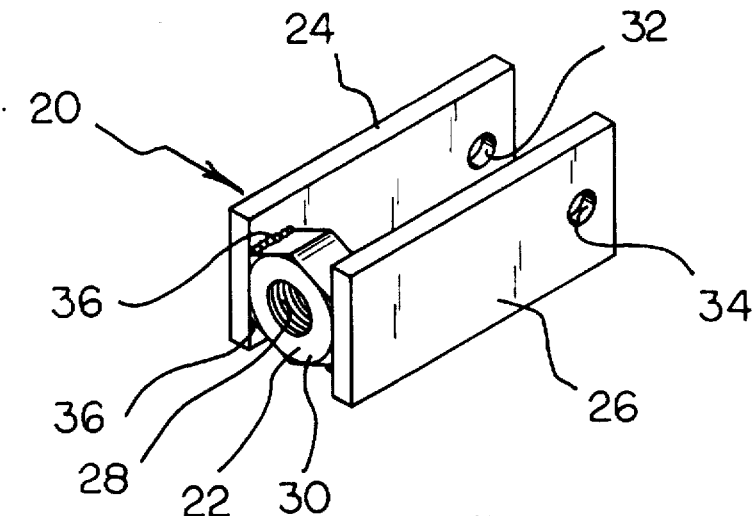
FIG. 5 is a bottom perspective view of the threaded insert of the invention of FIG. 1.
Figure 6:
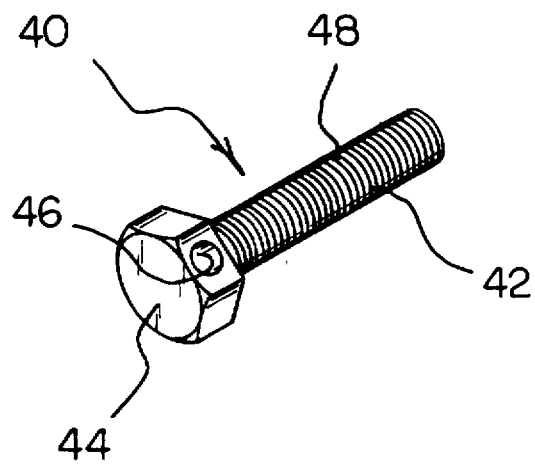
FIG. 6 is a bottom perspective view of the threaded post of the invention of FIG. 1.

From an overview standpoint, the trailer jack leveling adapter 10 is adapted for use for improving a fifth wheel trailer jack stand 60 having a pair of linked downwardly telescoping leg assemblies. Such downwardly extending leg assemblies are moved along a vertical axis by means of a crank, as shown in FIG. 1. Each leg assembly has an extensible square tubular lower portion 62 terminating in a foot pad 70 attachable with a clevis pin 52 and retaining clip 56. An independently continuously extensible coupling 10 is provided intermediate one of the leg assembly lower portions 62 and it's foot pad 70 whereby the length of the leg may be adjusted up to anywhere between 0 and 1 and ⅛ of an inch to compensate for an uneven supporting surface for leveling the trailer 100. Such extensible coupling may further be incrementally adjusted at intervals of 1 inch with respect to the associated leg assembly. See FIGS. 1, 2, and 8.

With reference now to FIGS. 1–8 and more specifically, it will be noted that a trailer jack leveling adapter 10 is shown.

The trailer jack leveling adapter 10 comprises a threaded insert 20 attached within a hollow lower end of the leg assembly lower portion 62 with the existing clevis pin 52. The insert 20 comprises a steel block 30 having opposing square edges and an axial vertical threaded bore 28. The block 30 comprises a ⅞ inch NC steel hex nut 22. The insert 20 further has a 3 inch long, 1¾ inch wide, and ¼ inch thick steel tab 24 and 26 projecting upwardly from two opposing edges of the nut 22. The tabs 24 and 26 are welded parallel the edges the nut 22 with a plurality of welds 36. Each tab 24 and 26 has a 25/64 inch diameter clevis pin receiving hole 32 and 34 centered laterally thereon ½ inch from the upper end thereof. The holes 32 and 34 are aligned with one pair 64 of a plurality of pairs of clevis pin receiving holes through the leg assembly lower portion 62. By allowing the selection of any one of the plurality of pairs of receiving holes, variable adjustment of the insert is afforded incrementally. As will become apparent later, such incrementally adjustment of the insert, in turn, affords incrementally adjustment of the height of the associated leg assembly in intervals of 1 inch.

The existing clevis pin 52 extends through the leg assembly holes 64 and also extends through the holes 32 and 34 of the tabs 24 and 26 whereby securing the insert 20 to the lower end of the leg assembly lower portion 62. In the preferred embodiment, the securement of the insert is effected inside the lower portion of the associated tubular leg assembly. This is to allow the insert to be inserted a greater distance within the associated leg assembly and thereby allow more versatility in the incrementally lowering of the leg assembly.

The existing retaining clip 56 is secured to the existing clevis pin 52 whereby securing the pin 52 to the leg assembly lower portion 62 and the insert 20. It should be noted that the specific length of the insert is critical for allowing more versatility in the incremental heightening of the leg assembly.

A generally vertical threaded round steel post 40 having a plurality of external threads 48 thereon comprises a ⅞ inch NC×2 inch steel hex head cap screw 42. The head 44 of the cap screw 42 is engagable with the trailer leg assembly foot pad 70. The screw head 44 has a lateral bore 46 therethrough aligned with a pair of opposed clevis pin receiving holes 76 and 82 of the foot pad 70. A clevis pin 92 extends through the receiving holes 76 and 82 of the foot pad 70 and also extends through the lateral bore 46 of the screw head 44 whereby pivotally securing the foot pad 70 to the head of the cap screw 42. The clevis pin 92 is secured to the foot pad 70 and cap screw 42 with a retaining clip 96. It should be noted that the receiving holes of the foot pad are formed in a pair of upwardly extending tabs. Such tabs are produced by rectangular cut outs being made in the foot pad and the metal being bent upwardly. The tabs are thus conveniently manufactured and the tabs are integral with the foot pad.

The post 40 is threadedly engaged with the insert nut 22 such that rotating the post 40 in one direction moves the foot pad 70 upwardly toward the insert 20. Rotating the post 40 in the other direction moves the foot pad 70 downwardly away from the insert 20. It should be noted that the post thereby allows continuous adjustment of the height of the associated leg assembly between 0 and 1 and ⅛ inches.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer jack leveling adapter for improving a fifth wheel trailer jack stand having a pair of linked downwardly telescoping leg assemblies, each leg assembly having an incrementally extensible square tubular lower portion terminating in a foot pad attachable with a clevis pin and retaining clip, by providing an independently continuously extensible coupling intermediate one of the leg assembly lower portions and it's foot pad whereby the leg may be adjusted to compensate for an uneven supporting surface for leveling the trailer, the trailer jack leveling adapter comprising:

a threaded insert attachable within a lower end of the leg assembly lower portion with the existing clevis pin, the insert comprising a steel block having opposing square edges and an axial vertical threaded bore, the block also having an elongated steel tab projecting upwardly from each of the opposing edges thereof, the tabs being parallel the threaded bore, each tab having a clevis pin receiving hole proximal an upper end thereof, the holes being aligned with each other and alignable with a pair of clevis pin receiving holes through the leg assembly lower portion such that the existing clevis pin may extend through the leg assembly holes and also extend through the aligned holes of the tabs for securing the insert to the lower end of the leg assembly lower portion, the existing retaining clip being securable to the existing clevis pin for securing the pin to the leg assembly lower portion and the insert;

a generally vertical round steel post having a plurality of external threads formed thereon, the post also having a trailer leg assembly foot pad engagable enlarged head portion integrally formed on a lower end thereof, the enlarged head having a lateral bore therethrough alignable with a pair of opposed clevis pin receiving holes of the foot pad, the post being threadedly engaged with the threaded bore of the insert such that rotating the post in one direction moves the head portion upwardly toward the insert and rotating the post in the other direction moves the head portion downwardly away from the insert; and a clevis pin extendable through the receiving holes of the foot pad, the clevis pin also extendable through the lateral bore of the post for pivotally securing the foot pad to the head portion of the threaded post, the clevis pin having a retaining clip whereby the pin may be secured to the foot pad and post.

2. The trailer jack leveling adapter of claim 1 wherein the threaded insert is secured to the lower end of the leg assembly lower portion with the existing clevis pin and the existing retaining clip and the foot pad is pivotally secured to the head portion of the threaded post with the clevis pin and retaining clip.

3. The trailer jack leveling adapter of claim 2 wherein the adapter may be extended to 1⅛ inch.

4. The trailer jack leveling adapter of claim 3 wherein the steel block comprises a ⅞ inch NC steel hex nut.

5. The trailer jack leveling adapter of claim 4 wherein the threaded post comprises a ⅞ inch NC×2 inch steel hex head cap screw.

6. The trailer jack leveling adapter of claim 5 wherein each elongated tab has a length of 3 inches, a width of 1¾ inches, and a thickness of ¼ inch.

7. The trailer jack leveling adapter of claim 6 wherein the tabs are welded to opposing edges of the hex nut.

8. The trailer jack leveling adapter of claim 7 wherein each tab clevis pin receiving hole is centered laterally on the tab ½ inch from the upper end thereof and has a diameter of 25/64 inch.

9. A trailer jack leveling adapter for improving a fifth wheel trailer jack stand having a pair of linked downwardly telescoping leg assemblies, each leg assembly having an incrementally extensible square tubular lower portion terminating in a foot pad attachable with a clevis pin and retaining clip, by providing an independently continuously extensible coupling intermediate one of the leg assembly lower portions and it's foot pad whereby the leg may be adjusted to compensate for an uneven supporting surface for leveling the trailer, the trailer jack leveling adapter comprising:

a threaded insert attachable within a lower end of the leg assembly lower portion with the existing clevis pin, the insert comprising a steel block having opposing square edges and an axial vertical threaded bore, the block also having an elongated steel tab projecting upwardly from each of the opposing edges thereof, the tabs being parallel the threaded bore, each tab having a clevis pin receiving hole proximal an upper end thereof, the holes being aligned with each other and alignable with a pair of clevis pin receiving holes through the leg assembly lower portion such that the existing clevis pin may extend through the leg assembly holes and also extend through the aligned holes of the tabs for securing the insert to the lower end of the leg assembly lower portion, the existing retaining clip being securable to the existing clevis pin for securing the pin to the leg assembly lower portion and the insert;

a generally vertical round steel post having a plurality of external threads formed thereon, the post also having a trailer leg assembly foot pad engagable enlarged head portion integrally formed on a lower end thereof, the enlarged head having a lateral bore therethrough alignable with a pair of opposed clevis pin receiving holes of the foot pad, the post being threadedly engaged with the threaded bore of the insert such that rotating the post in one direction moves the head portion upwardly toward the insert and rotating the post in the other direction moves the head portion downwardly away from the insert; and a clevis pin extendable through the receiving holes of the foot pad, the clevis pin also extendable through the lateral bore of the post for pivotally securing the foot pad to the head portion of the threaded post, the clevis pin having a retaining clip whereby the pin may be secured to the foot pad and post;

said threaded insert secured to the lower end of the leg assembly lower portion with the existing clevis pin and the existing retaining clip and the foot pad is pivotally secured to the head portion of the threaded post with the clevis pin and retaining clip;

said adapter adapted to be extended to 1⅛ inch;

said steel block comprising a ⅞ inch NC steel hex nut;

said threaded post comprising a ⅞ inch NC×2 inch steel hex head cap screw;

said elongated tab each having a length of 3 inches, a width of 1¾ inches, and a thickness of ¼ inch;

said tabs welded to opposing edges of the hex nut; and said tab clevis pin receiving holes each centered laterally on the tab ½ inch from the upper end thereof and has a diameter of 25/64 inch.

* * * * *